Dec. 27, 1932.   G. W. PICKARD   1,892,362
ELECTRICAL CONDENSER AND METHOD OF MAKING THE SAME
Original Filed Dec. 29, 1922   2 Sheets-Sheet 1
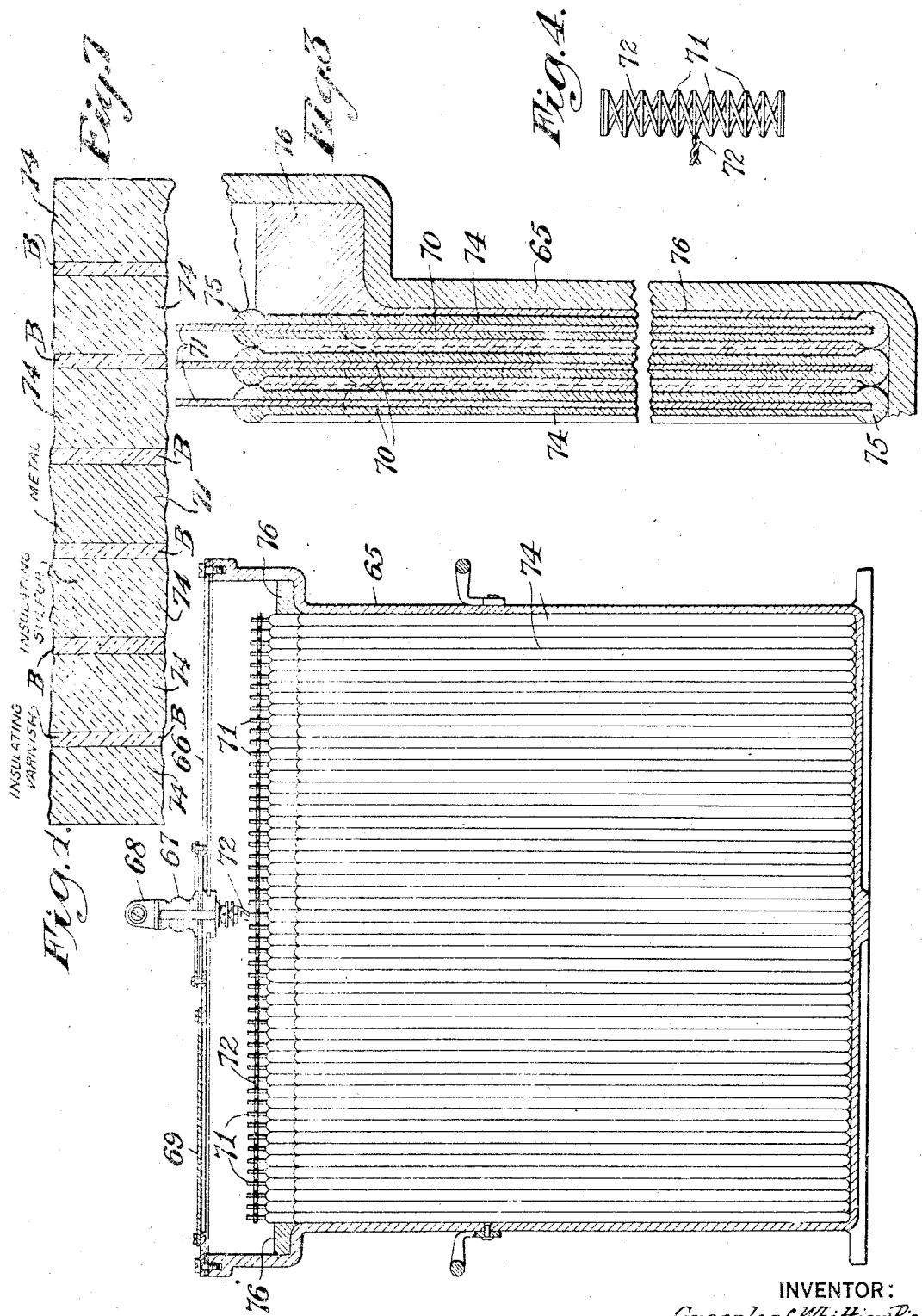
INVENTOR:
Greenleaf Whittier Pickard
BY
Philip Farnsworth
his ATTORNEY.

Dec. 27, 1932.  G. W. PICKARD  1,892,362
ELECTRICAL CONDENSER AND METHOD OF MAKING THE SAME
Original Filed Dec. 29, 1922   2 Sheets-Sheet 2
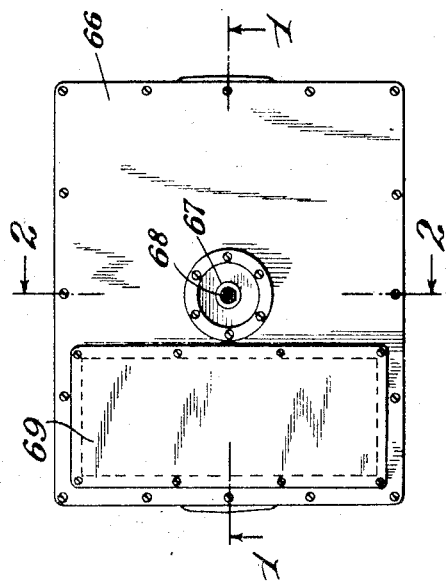
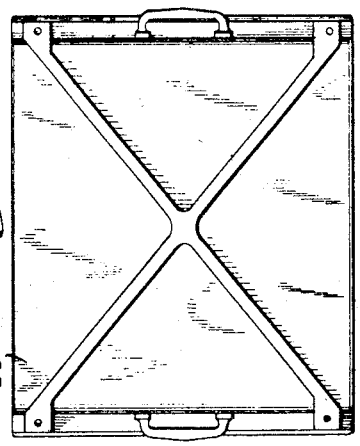
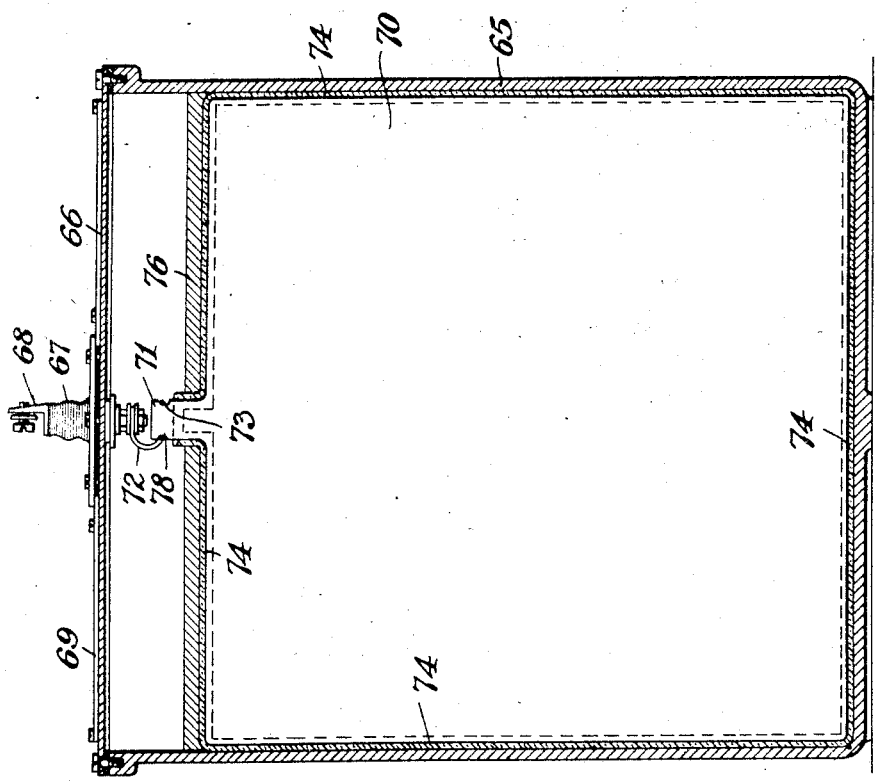
INVENTOR:
Greenleaf Whittier Pickard
BY
Philip Farnsworth
his ATTORNEY.

Patented Dec. 27, 1932                                       1,892,362

UNITED STATES PATENT OFFICE

GREENLEAF WHITTIER PICKARD, OF NEWTON CENTER, MASSACHUSETTS, ASSIGNOR, BY MESNE ASSIGNMENTS, TO GENERAL ELECTRIC COMPANY, A CORPORATION OF NEW YORK

ELECTRICAL CONDENSER AND METHOD OF MAKING THE SAME

Original application filed December 29, 1922, Serial No. 609,552. Divided and this application filed December 6, 1927. Serial No. 238,066.

This invention relates to electrical condensers and methods of making the same.

An object of the invention is to provide a cheap condenser of high efficiency.

Another object of the invention is to so employ and prepare sulfur or its equivalent as a dielectric as to take full advantage of the extremely low dielectric loss and high insulation resistance of the material and at the same time to ensure such a condition of the material as will avoid the troubles resulting otherwise from the use of a brittle and porous material.

This application is a division of my co-pending application, Serial No. 609,552, filed December 29, 1922.

Condensers are usually built as stacks composed of sheets of foil and dielectric, such as mica or paper. For high potential work, the stack is built up of sections of sheets of foil and dielectric connected in series, the greater the number of sections the less the capacity will be for a given size sheet. Such condensers are unsatisfactory, however, where high potential is necessary with comparatively low capacity. Also such condensers are unsatisfactory, and in many cases impracticable for use in high voltage direct current circuits, owing to the difference in leakage across different sections, which soon results in extreme potentials across non-leaky sections, causing their destruction. To build such a condenser of mica is also expensive.

In order to provide a cheap, compact condenser it is contemplated in the present invention to use sulfur (preferably in a special form), or an equivalent, as a dielectric between the armature plates. Sulfur, for example, has an extremely high insulating resistance, but heretofore its brittleness and porosity have prevented its use to any extent as an insulating or dielectric material, especially for use in high tension electrical condensers. On the other hand, the advantages of sulfur for electrical use are as follows:—low dielectric loss, high insulation resistance, high dielectric constant, cheapness, good dielectric strength and high melting point (115°–119° C.) and its rigidity and entire absence of cold flow below the melting point.

The condenser of the present invention is characterized by simplicity and uniformity of parts which may be easily assembled whereby the condenser cost is reduced to a minimum.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is an elevation of a condenser embodying this invention, the casing being shown in section;

Fig. 2 is a sectional view on the line 2—2 of Fig. 5, looking in the direction of the arrows;

Fig. 3 is an enlarged sectional detail view of the plates of this condenser;

Fig. 4 is a detail plan view, illustrating how the several plates are connected together;

Fig. 5 is a plan view of the condenser casing; and

Fig. 6 is a bottom plan view of the casing.

Fig. 7 is an enlarged detailed section of a special form.

Like reference characters denote like parts in the several figures of the drawings.

In the following description and in the claims parts will be identified by specific names for convenience, but they are intended to be as generic in their application to similar parts as the art will permit.

The type of condenser disclosed in the drawings is especially adapted for high potential work for use in radio transmitters, and is designed to have a capacity of .004 mfd. at a working voltage of 18,000 volts maximum or thereabouts, i. e. it is a high potential but low capacity device. The invention, however, is not limited to a condenser of this particular size.

The exemplary condenser comprises a metal casing or box 65 having a metal cover cover 66 which is placed in position after the dipped plates 70 are arranged in the box. On the cover is the insulating bushing 67 and high potential terminal 68. The cover has a removable piece 69, Figs. 5, 1, i. e., to permit access to the interior of the box.

The metal plates 70 have projecting tabs or terminals 71 (Fig. 2) arranged in alinement at the edge adjacent terminal 68. A wire 72 (Figs. 2 and 4) is wound back and forth connecting the several terminals or tabs 71, the latter being reduced at 73 to hold the wire in place. The ends of the wire 72 are electrically connected to the terminal 68. This arrangement provides means for easily and quickly connecting all the tabs 71 to the terminal 68.

The plates 70 are dipped in sulfur in the manner to be described, forming coatings 74 of sulfur on the faces and edges 75, such coatings bulging at the edges (shown exaggerated in Fig. 3). When the several coated sheets are arranged in mechanical parallelism face to face within the casing 65 as illustrated, a low melting point fusible metal as mercury 76 is poured into the casing, filling the spaces between the plates 70 forming the armatures of polarity opposite to 76. The level of the armature 76 should be below the tops of the coatings 74 so as not to short-circuit the condenser. For this purpose, the level of the metal 76 may be even lower than shown in the drawings, Figs. 2 and 3. The molten metal occupies the spaces between the coated or dielectric-enclosed plates 70 and between the latter and the side wall 65 of the casing.

The metal plates may be dipped in molten sulfur at a temperature of between 118° C. and 145° C. and then removed, a thin film of sulfur clinging to the plates. This film very quickly solidifies and crystallizes in the rhombic form. In order to secure a compact, non-porous mass of dielectric between the plates of the condenser, the several armature plates 70 of the condenser before assembly in the casing may be dipped in molten sulfur at a temperature of around 130° C. This dipping may be repeated, after the sulfur has solidified each time, until a layer of sulfur is formed around each armature plate of such a thickness that the sulfur layers upon successive plates will almost touch.

If a metal plate 70 is dipped successively in the sulfur, successive coatings of sulfur will be deposited thereon. With an aluminum plate 70 of approximately 35 mils in thickness and a sulfur bath approximating 135° C., I have found the first layer to be approximately 10 mils thick. The sulfur appears to cool and solidify with its crystal axis parallel to the surface of the metal plate 70. Upon the first dipping, microscopic depressions will be formed on the surface of the sulfur. On the second dipping, these depressions will be smaller, until upon successive dippings they entirely disappear. The material formed on the plate adheres very firmly thereto and has a hard texture. With plates of a given thickness and a bath of a given temperature and a given speed of dipping, the deposit 75 or thickness of the sulfur deposited on the plate can be controlled and duplicated on the plurality of metal plates 70. In any case the mercury 76 makes close intimate contact with the opposing dielectric coatings 75 on adjacent plates 70, and maintains the spacing between the face of the coated plates intermediate the edges of the latter. Such coated plates may be assembled with solid metal armatures to form a condenser.

In cases where a fairly heavy coating is required, the sulfur coatings may be applied in layers by interposing insulating varnish dipping operations between the sulfur dipping operations and producing a structure, Fig. 7 (diagrammatic), in which the layers 74 are separated from one another by flexible and very thin bindings B, of insulating adhesive or varnish. I find that when such a structure is prepared, with the greater thickness of the total layers 74 and coatings B, there is less liability of cracks developing in the greater total thickness of the sulfur, and furthermore that when cracks do develop they do not penetrate through the complete coating but tend to stop at a varnished binding surface B. Such a condenser may be made by dipping the metal armatures 71 in a bath of liquid varnish or adhesive, and then dipping the same in a bath of sulfur, and alternating the dipping in varnish and sulfur until the total desired thickness of the sheets of dielectric is obtained, allowing the successive sulfur layers to cool each time before dipping in the binder path.

The present invention provides a compact, cheap condenser for general usage but especially adapted for low capacity and high voltage work and in which the sulfur is used as a dielectric 75. Sulfur when treated by the processes herein described is superior to wax for a dielectric because of its higher dielectric constant and lower loss compared with wax at higher temperatures and because sulfur withstands temperatures of a relatively higher order and where brushing occurs does not undergo chemical change. Wax, on the other hand, carbonizes and releases water at higher temperatures. Another property of sulfur is its ability to withstand breakdown without any change whatever and its apparent greater thermo-conductivity as compared with waxes.

A valuable feature in connection with the use of sulfur as a dielectric is that when it does break down, it heals immediately and is unimpaired. In cases where a section of sulfur dielectric has been broken down several hundred times, its final breakdown voltage was higher than its first. This is unique among condenser dielectrics, and resides in the fact that sulfur is an element and cannot be decomposed by an electric discharge. All that happens when sulfur dielectric breaks down is the momentary formation of a gaseous or liquid sulfur, which interrupts the electric discharge, (liquid sulfur having a higher breakdown strength than solid sulfur) and which at once solidifies and restores the condenser to its original or even better condition. With wax, a breakdown forms carbon and the dielectric is weaker than before. Similarly, with mica, the solid is either punctured beyond repair, or the chemical composition is so broken down as to form a conducting path. Again, if the sulfur dielectric should happen to crack, this crack will rapidly be healed and sealed up because the rush of current following a breakdown seals the fault almost instantly. For instance, a one-eighth inch layer of sulfur showed initial breakdown of about 20,000 volts, but after a number of breakdowns its dielectric strength rose to over 42,000 volts. The ideal condenser dielectric is then a simple, non-conducting, chemical element, having suitable insulating and dielectric qualities, such as sulfur.

To ensure rehealing of sulfur dielectric, the armatures of the condenser should have a fairly good thermal-conductivity and should be composed of relatively high melting point metals which are not appreciably attacked by sulfur to form sulfides under localized heating due to breakdown. For instance, thin foils are less suited than heavier elements having greater thermal-conductivity. Suitable materials for armatures for use in rehealing sulfur condensers are aluminum, brass and iron, which are sufficiently chemically inert to sulfur under service conditions as contrasted with copper, which is readily attacked by sulfur. The degree of the several qualities or properties required in armatures can be varied relatively to each other. For instance, if the thermal-conductivity is relatively high, the melting point may be relatively lower and the degree of chemical inertness to sulfur may be less. In any event, the character or quality of the armatures should be such that sulfides or metal streaks will not form a conductive path through the sulfur upon heating due to breakdown. Under the above conditions, the sulfur will immediately reheal, leaving the condenser in its original condition.

Before the above-described process or method is performed, the sulfur used therein is preferably previously prepared by melting the roll sulfur of commerce and heating the molten sulfur for a period of several hours at a temperature to maintain it in a molten condition (either viscid or liquid, or both). This long heat treatment causes a change in the commercial sulfur, which may be due to the removal of gases or water, or other entrapped volatile substances in the commercial sulfur, and produces a cast which is compact, hard and cohesive, as contrasted with the cast prepared by simply bringing commercial roll sulfur up to the molten condition and then, without prolonged heating, allowing it to cool. The time required to produce the sulfur with the above properties will vary directly with the temperature at which it is heated. For instance, I have obtained very good results by heating the sulfur for five hours while maintaining the temperature at about 185° C., and very good results by maintaining a temperature of 170° C. for about ten hours. At temperatures above 185° C., the sulfur tends to catch on fire. Roll sulfur that has been simply heated for a short time and then immediately allowed to cool, produces a cast which generally is a loose crystalline mass having a very small cohesion in its body. All the sulfur used in the herein-described processes or methods should preferably be subjected to more or less prolonged treatment prior to its use as a condenser dielectric, at least to the extent of removing moisture.

It is to be understood that the invention is not limited to the embodiments and features specifically shown and described herein, but that such embodiments and features are subject to changes and modifications without any departure from the spirit of the invention.

What is claimed is:

1. In an electrical condenser, a metallic armature plate having a coating of sulfur thereon forming a dielectric and a conductor of lower melting point than said sulfur coating and lying in close and intimate contact with said coating forming the opposite polarity armature of said condenser.

2. An electrical condenser including at least three armature plates of which the two end plates have on their facing surfaces normally solid dielectric coatings formed by immersion of said end plates in the dielectric material in liquid form, said coatings including laterally projecting portions spacing said two end plates from one another; the intermediate third armature plate being located in said space and having as dielectric on its two faces, said coatings on the facing surfaces of said end plates.

3. In an electrical condenser, an armature and a dielectric thereon including alternating coatings of insulating binder and layers of sulfur and a second armature in surface contact with such dielectric.

4. An electrical condenser comprising a casing, a plurality of solid metal armatures coated with normally solid readily fusible solid dielectric and supported within said casing in position spaced from one another, and an opposing armature system for said condenser comprising a body of conductive material which is liquid at temperature below the melting point of the dielectric, said opposing liquid armatures occupying the spaces in the casing between said spaced coating armatures.

5. An electrical condenser comprising a casing, a plurality of solid metal armatures coated with readily fusible normally solid dielectrical material and supported within said casing in position spaced from one another, and an opposing armature system for said condenser comprising a body of conductive material which is a liquid at temperatures below the melting point of the dielectric coatings on said armatures, said opposing armature system being insulated from the metal of the coated armatures, by the dielectric coatings thereon, and said opposing armature system occupying the spaces in the casing between said spaced coated plates.

6. An electrical condenser comprising a casing, a plurality of solid metal armature plates coated with fusible solid dielectric and supported within said casing in positions with their coated faces spaced from one another, and an opposing armature for said condenser comprising mercury in the form of liquid plates occupying spaces between said coated plates.

7. A condenser including a plate-enclosing casing having at least its lower portion liquid-tight and at least its bottom portion of metal and having an insulating portion between terminals of opposite polarity; metallic plates enclosed by said casing and fixedly supported along their edge portions in vertical positions with their vertical faces in spaced relation to one another and having coatings of dielectric material fusible at moderately high temperatures but normally solid and adhering to their faces and to lower portions at least of their edges; said coatings on mutually facing plates being more narrowly spaced apart than the metallic plates themselves; said dielectric coatings and metallic plates constituting respectively the condenser dielectric and one of the armature systems of the condenser; a body of mercury held by the lower liquid-tight portion of the casing, said body of mercury occupying the relatively narrow vertical spaces between the portions of said dielectric coatings adhering to the mutually facing metallic plates thereby constituting a second armature system of the condenser in the form of liquid plates, said body of mercury being in electrical contact with said metallic bottom portion of the casing thereby constituting the latter as one of the terminals of the condenser, said dielectric coatings insulating the spaced coated plates from the mercury; and the entire body of mercury including its portions constituting the liquid armature plates between said dielectric coatings constituting a means maintaining the spaced relations of the faces of the coated plates intermediate their edges; and a second terminal extending from the metal of the upper portions of the coated plates to the exterior of the casing, said insulating portion of the casing serving to insulate said second terminal from the metallic bottom portion of the casing which is electrically connected with said liquid armature plates.

8. A condenser including a plate-enclosing casing having at least its lower portion liquid-tight and at least its bottom portion of metal and having an insulating portion between terminals of opposite polarity; metallic plates enclosed by said casing and fixedly supported along their edge portions in vertical positions with their vertical faces in spaced relations to one another and to the side wall of the casing; dielectric material enclosing the lower portions of the faces and edges of said spaced metallic plates but having portions along the faces of mutually spacing plates which are more narrowly spaced apart than said plate-faces themselves, said dielectric material being fusible at moderately high temperatures but normally solid; said dielectric plate-enclosures and metallic plates constituting respectively the condenser dielectric and one of the armature systems of the condenser; a body of mercury held by the lower liquid-tight portion of the casing, said body of liquid occupying the vertical spaces in the casing between the casing wall and the plate-enclosing dielectric material and occupying also the relatively narrow vertical spaces in the form of vertical liquid plates in the casing between said spaced dielectric plate-enclosures thereby maintaining said spacings, and said vertical liquid metal plates constituting another armature system of the condenser, said body of mercury being in electrical contact with said metallic bottom portion of the casing constituting the latter as one of the terminals of the condenser, said dielectric plate-enclosures insulating the spaced plates of said first armature system from the mercury; and a second terminal extending from the metal of the upper portions of the plates of said first armature system to the exterior of the casing said insulating portion of the casing serving to insulate said second terminal from the metallic bottom portion of the casing which is connected with said liquid armature-plates.

9. A condenser including a plate-enclosing casing having at least its lower portion liquid-tight and at least its bottom portion of metal and having an insulating portion located between terminals of opposite polarity; metallic plates enclosed by said casing and fixedly supported along their edge portions in vertical positions with their vertical faces in spaced relations to one another; dielectric material enclosing the lower portions of the faces and edges of said spaced metallic plates but having portions along the faces of mutually facing plates which are more narrowly spaced apart than said plate-faces themselves, said dielectric material being fusible at moderately high temperature but normally solid; said dielectric plate-enclosures and metallic plates constituting respectively the condenser dielectric and one of the armature systems of the condenser; a body of mercury held by the lower liquid-tight portion of the casing, said body of mercury occupying the relatively narrow vertical spaces in the casing between said spaced dielectric plate-enclosures thereby constituting a second armature system of the condenser in the form of liquid plates, said body of mercury being in electrical contact with said metallic bottom portion of the casing thereby constituting the latter as one of the terminals of the condenser, said dielectric plate-enclosures insulating the spaced plates of said first armature system from the mercury; and the entire body of mercury including its portions constituting the liquid armature-plates between said dielectric plate-enclosures constituting a means maintaining the spaced relations of the faces of said enclosed plates intermediate their edges; and a second terminal extending from the metal of the upper portions of the plates of said first armature system to the exterior of the casing, said insulating portion of the casing serving to insulate said second terminal from the metallic bottom portion of the casing which is electrically connected with said liquid armature-plates.

10. The method of manufacturing a condenser which consists in forming coatings of fusible dielectric material on one set of armature plates for one polarity, and introducing molten metal of lower melting point into narrow spaces between the faces of opposing coatings of such armature plates thereby forming between said dielectric coatings the other set of armature plates for opposite polarity.

11. The method of making a condenser which consists in forming a coating of sulfur on the condenser armature for one polarity; and while said coated armature is fixedly supported inside a receptacle forming a space alongside said sulfur coating, then introducing a body of mercury into said receptacle causing the mercury to occupy said space and constitute the condenser armature for opposite polarity.

12. The method of forming a condenser armature for one polarity for cooperation with another armature for opposite polarity which consists in fixedly supporting the latter armature enclosed in dielectric material inside a liquid-tight receptacle forming a space therein along the surface of said dielectric material, and then introducing molten metal into said space along the surface of said dielectric material.

13. The method of making electrical condensers which consists in applying molten sulfur to at least one face of the armatures thereof, while such sulfur is in molten condition, which sulfur previously has been subjected to prolonged heating, said application forming adherent liquid sulfur coatings on the condenser armatures which when cooled to normal temperature consist of sulfur in substantially moisture-free condition.

14. A condenser comprising an electrically conductive foundation coated with a layer of sulfur and having within the sulfur coating a very thin coating of an insulating binder.

15. A condenser comprising a metallic armature plate, dielectric layer of irregular thickness formed on and adherent to said plate, and a metal adapted to flow contiguous said dielectric and to conform to the contour thereof.

16. A condenser comprising metal plates coated with sulphur, the sulphur being shaped to space the plates apart and provide recesses between the plates, and a metal filling said recesses and conforming to the shape thereof.

In testimony whereof I hereunto affix my signature.

GREENLEAF WHITTIER PICKARD.